United States Patent
Guo

(10) Patent No.: US 11,528,351 B2
(45) Date of Patent: Dec. 13, 2022

(54) TERMINAL DEVICE

(71) Applicant: BEIJING XIAOMI MOBILE SOFTWARE CO., LTD., Beijing (CN)

(72) Inventor: Jinhao Guo, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/382,559

(22) Filed: Jul. 22, 2021

(65) Prior Publication Data

US 2022/0311842 A1  Sep. 29, 2022

(30) Foreign Application Priority Data

Mar. 23, 2021  (CN) .......................... 202110308398.5

(51) Int. Cl.
*H04M 1/02* (2006.01)

(52) U.S. Cl.
CPC ......... *H04M 1/0216* (2013.01); *H04M 1/026* (2013.01)

(58) Field of Classification Search
CPC ............................ H04M 1/0216; H04M 1/026
See application file for complete search history.

(56) References Cited

U.S. PATENT DOCUMENTS

| | | | | | |
|---|---|---|---|---|---|
| 7,444,175 B2 * | 10/2008 | Ito | ........................ | H04B 7/0871 |
| | | | | | 455/66.1 |
| 2005/0143151 A1 * | 6/2005 | Ito | ........................ | H04B 7/0871 |
| | | | | | 455/575.5 |
| 2009/0181732 A1 * | 7/2009 | Isoda | .................. | H04M 1/0216 |
| | | | | | 343/702 |
| 2009/0231215 A1 * | 9/2009 | Taura | .................. | H01Q 21/064 |
| | | | | | 343/702 |
| 2010/0013720 A1 * | 1/2010 | Sakata | .................. | H01Q 1/243 |
| | | | | | 343/702 |
| 2012/0001822 A1 * | 1/2012 | Liu | ........................ | H01Q 1/243 |
| | | | | | 343/852 |
| 2017/0141820 A1 * | 5/2017 | Kim | ........................ | H01Q 1/42 |
| 2017/0142241 A1 * | 5/2017 | Kim | ........................ | H01Q 5/385 |
| 2017/0346164 A1 * | 11/2017 | Kim | ........................ | H01Q 1/243 |

(Continued)

FOREIGN PATENT DOCUMENTS

| CN | 109546305 A | 3/2019 |
|---|---|---|
| EP | 3661171 A1 | 6/2020 |

OTHER PUBLICATIONS

Antenna Design for Mobile Devices by Zhijun Zhang published 2011.

(Continued)

*Primary Examiner* — Jinsong Hu
*Assistant Examiner* — Rui M Hu
(74) *Attorney, Agent, or Firm* — Syncoda LLC; Feng Ma

(57) ABSTRACT

A terminal device includes: a first middle frame; a second middle frame connected to the first middle frame, wherein the first middle frame and the second middle frame are configured to fold or unfold via a rotary shaft; a first antenna module, disposed on the first middle frame; a second antenna module, disposed on the second middle frame, wherein when the first middle frame and the second middle frame are closed, a projection of the second antenna module to the first antenna module at least partially overlaps with the first antenna module; and the first antenna module and the second antenna module are respectively connected to corresponding feed circuits.

18 Claims, 4 Drawing Sheets

(56) References Cited

U.S. PATENT DOCUMENTS

| | | | | |
|---|---|---|---|---|
| 2017/0351297 A1* | 12/2017 | Kim | ........................ | H01Q 1/243 |
| 2018/0366813 A1* | 12/2018 | Kim | ........................ | H01Q 1/24 |
| 2019/0007533 A1* | 1/2019 | Kim | ........................ | H01Q 9/30 |
| 2019/0140342 A1* | 5/2019 | Lim | ........................ | H01Q 5/335 |
| 2020/0044315 A1* | 2/2020 | Gu | ........................ | H01Q 21/28 |
| 2020/0076062 A1* | 3/2020 | Lee | ..................... | H04M 1/0277 |
| 2020/0266524 A1* | 8/2020 | Yoon | ........................ | H01Q 5/328 |
| 2020/0333855 A1* | 10/2020 | Kim | ........................ | G06F 1/1681 |
| 2021/0075459 A1* | 3/2021 | Noh | ..................... | H04M 1/0216 |
| 2021/0185164 A1* | 6/2021 | Jung | ................. | H04M 1/72454 |
| 2021/0218137 A1* | 7/2021 | Zhu | ........................ | H01Q 5/328 |
| 2021/0320410 A1* | 10/2021 | Liu | ..................... | H04B 1/3838 |
| 2021/0328329 A1* | 10/2021 | Kim | ........................ | H01Q 1/243 |
| 2022/0115768 A1* | 4/2022 | Oh | ........................ | H01Q 5/385 |

OTHER PUBLICATIONS

Extended European Search Report in Application No. 21188821.9, dated Jan. 14, 2022.

* cited by examiner

TERMINAL DEVICE

CROSS-REFERENCE TO RELATED APPLICATION

This application claims priority to Chinese Patent Application No. 202110308398.5 filed on Mar. 23, 2021, the disclosure of which is hereby incorporated by reference in its entirety.

BACKGROUND

Foldable devices such as foldable tablet computers and foldable mobile phones are becoming popular among users. Such foldable devices occupy smaller spaces and are convenient for carry or placed in pockets when folded, and have larger screen areas when in an unfolded state.

SUMMARY

The present disclosure relates generally to the field of communication technologies, and more specifically to a terminal device.

A terminal device provided by embodiments of the present disclosure at least includes:

a first middle frame;

a second middle frame, connected to the first middle frame, wherein the first middle frame and the second middle frame are configured to fold or unfold through a rotary shaft;

a first antenna module, disposed on the first middle frame;

a second antenna module, disposed on the second middle frame, wherein when the first middle frame and the second middle frame are closed, a projection of the second antenna module on the first antenna module at least partially overlaps with the first antenna module; and wherein the first antenna module and the second antenna module are connected to corresponding feed circuits, respectively.

In some embodiments, the first antenna module includes: a first radiator and a second radiator, and a first slit is provided between the first radiator and the second radiator;

the second antenna module includes: a third radiator and a fourth radiator, and a second slit is provided between the third radiator and the fourth radiator;

when the first middle frame and the second middle frame are closed, the first radiator and the third radiator overlap with each other, and the first slit and the second slit overlap with each other; and the feed circuit of the second antenna module is connected to the fourth radiator.

In some embodiments, the first antenna module further includes a fifth radiator and a sixth radiator, and a rib is provided between the second radiator and the fifth radiator, a third slit is provided between the sixth radiator and the fifth radiator.

In some embodiments, the feed circuit of the second antenna module includes a switch module, configured to switch a feed position of the second antenna module to be open-circuited or short-circuited when frequency bands for transmitting and receiving a wireless signal by the terminal device are different.

In some embodiments, the feed circuit of the second antenna module further includes:

an inductor, wherein one end of the inductor is connected to a feed source, and the other end of the inductor is connected to the switch module; and at least two capacitors arranged in parallel, wherein one end of each capacitor is grounded, and the other end is connected to the switch module;

when a state of the switch module is in connection with the capacitor, the feed position of the second antenna module is short-circuited; and when the state of the switch module is in disconnection with the capacitor, the feed position of the second antenna module is open-circuited.

In some embodiments, the at least two capacitors arranged in parallel include:

a first capacitor and a second capacitor arranged in parallel with the first capacitor, and a first capacitance value is greater than a second capacitance value;

when the first middle frame and the second middle frame are unfolded, the state of the switch module is in connection with the first capacitor and in disconnection with the second capacitor; and when the first middle frame and the second middle frame are closed, the state of the switch module is in connection with the second capacitor and in disconnection with the first capacitor.

In some embodiments, a radiation length of the fourth radiator is greater than a radiation length of the third radiator.

In some embodiments, the third radiator and the fourth radiator are both in an inverted L shape.

In some embodiments, a sum of a radiation length of the second radiator, a radiation length of the fifth radiator, a radiation length of the sixth radiator, a width of the rib and a width of the third slit is equal to a radiation length of the fourth radiator.

In some embodiments, the first radiator and the sixth radiator are both in an inverted L shape.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

In a foldable terminal device such as a foldable mobile phone, middle frames on primary and secondary sides of the foldable mobile phone will be in contact with each other in a closed state, which may reduce the performance of antennas on the primary and secondary sides of the foldable mobile phone. A groove is typically formed in the secondary side of the foldable mobile phone, which is in symmetry with a groove formed in the primary side of the foldable mobile phone, so that the grooves on the primary and secondary sides are identical in the closed state, which may reduce an impact of coupling between the primary and secondary sides.

Figure 1:
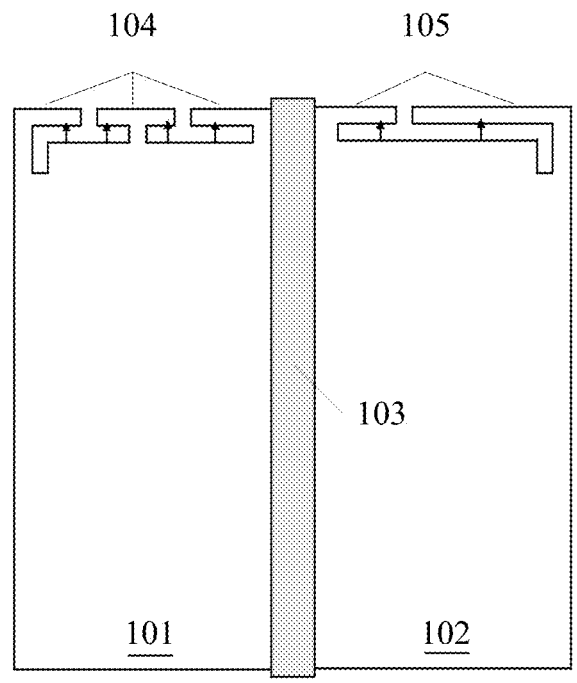
FIG. 1 is a first schematic diagram showing a terminal device according to some embodiments.

FIG. 1 is a first structural diagram showing a terminal device according to some embodiments. As shown in FIG. 1, the terminal device at least includes:

a first middle frame 101;

a second middle frame 102, connected to the first middle frame 101; wherein, the first middle frame 101 and the second middle frame 102 are configured to fold or unfold through a rotary shaft 103;

a first antenna module 104, located on the first middle frame 101;

a second antenna module 105, located on the second middle frame 102, wherein when the first middle frame 101 and the second middle frame 102 are closed, a projection of the second antenna module 105 on the first antenna module 104 at least partially overlaps with the first antenna module 104; and the first antenna module 104 and the second antenna module 105 are connected to corresponding feed circuits, respectively.

The terminal device is a terminal device with a foldable form, which can be a wearable electronic device or a mobile terminal. The mobile terminal includes a mobile phone, a laptop, and a tablet computer, and the wearable electronic device includes a smart watch or a smart necklace, which is not limited by the embodiments of the present disclosure.

The first middle frame can be a middle frame accommodating a main board on a primary side, and the main board is provided with a processing module. The second middle frame can be a middle frame on a secondary side corresponding to the middle frame on the primary side. An audio module for outputting an audio or a camera module for acquiring an image can be accommodated in the middle frame on the secondary side, which is not limited by the embodiments of the present disclosure.

In the embodiments of the present disclosure, a size and shape of the first middle frame may match a size and shape of the second middle frame. For example, the size of the first middle frame can be equal to the size of the second middle frame; and the shape of the first middle frame and the shape of the second middle frame may both be square.

The first middle frame and second middle frame can be rotatable through the rotary shaft, and an angle range of the rotation can be between 0 and 360 degrees. For example, when the rotary shaft rotates from 0 degree to 180 degrees, the first middle frame and the second middle frame can be unfolded through the rotary shaft. Then the first middle frame and the second middle frame can be located on a same plane; when the rotary shaft rotates from 180 degrees to 0 degree, the first middle frame and the second middle frame can be closed through the rotary shaft. At this time, a projection of the first middle frame on the second middle frame overlaps with the second middle frame.

In some embodiments, the first middle frame and the second middle frame may also rotate synchronously through the rotary shaft. For example, the first middle frame and the second middle frame may rotate 90 degrees synchronously, so that the first middle frame and the second middle frame can be closed or unfolded faster through the rotary shaft.

The first antenna module is located on the first middle frame. In some embodiments, the first middle frame includes a frame body accommodating a functional device and a frame edge surrounding the frame body, and the first antenna module can be located on the frame edge; in other embodiments, the first middle frame can be rectangular, and the first antenna module can be arranged on a short edge or a long edge of the rectangular first middle frame, which is not limited by the embodiments of the present disclosure.

In some embodiments, the first antenna module may operate in a frequency band from 600 MHz to sub 6G, which, for example, may cover a 4G frequency band, a sub 6G frequency band, a GPS frequency band, and a Wi-Fi frequency band.

The second antenna module is located on the second middle frame. In some embodiments, the second middle frame includes a frame body accommodating a functional device and a frame edge surrounding the frame body, and the second antenna module can be located on the frame edge; in other embodiments, the second middle frame can be rectangular, and the second antenna module can be arranged on a short edge or a long edge of the rectangular second middle frame, which is not limited by the embodiments of the present disclosure.

In the embodiments of the present disclosure, the second antenna module and the first antenna module may transmit and receive a part of wireless signals in a same frequency band, and may also transmit and receive wireless signals in completely different frequency bands, which is not limited by the embodiments of the present disclosure.

In some embodiments, the second antenna module can be used for transmitting and receiving wireless signals in B1, B3, and B39 frequency bands, and the first antenna module can be used for transmitting and receiving wireless signals in a Wi-Fi 2.4 GHz or a 5 GHz frequency band.

In the embodiments of the present disclosure, the first antenna module and the second antenna module may both be inverted-F antennas (IFA) or loop antennas, which are not limited in the embodiments of the present disclosure.

The first antenna module and the second antenna module are located on a same side of the terminal device. For example, when the first middle frame and the second middle frame are both rectangular, and a first short edge of the first middle frame and a second short edge of the second middle frame are located on the same side of the terminal device in a situation where the first middle frame and the second middle frame are closed, the first antenna module can be arranged on the first short edge, and the second antenna module can be arranged on the second short edge.

In another example, when the first middle frame and the second middle frame are both rectangular, and a first long edge of the first middle frame and a second long edge of the second middle frame are located on the same side of the terminal device in the situation where the first middle frame and the second middle frame are closed, the first antenna module can be arranged on the first long edge, and the second antenna module can be arranged on the second long edge.

In the embodiments of the present disclosure, feed circuits corresponding to the first antenna module and the second antenna module respectively have two states, one state includes an open-circuited state or a short-circuited state, and the other state includes impedance matching of feeding.

The first antenna module and the second antenna module are connected to corresponding feed circuits, respectively. In other words, both the first antenna module and the second antenna module have independent feed circuits. When the first middle frame and the second middle frame are closed or unfolded, mutual interference between transmitting and receiving a wireless signal by the first antenna module and transmitting and receiving the wireless signal by the second antenna module can be reduced by adjusting the state of the feed circuit corresponding to the first antenna module and the state of the feed circuit corresponding to the second antenna module, thereby improving transceiving performance of the first antenna module and the second antenna module.

In some embodiments, when the first antenna module transmits and receives the wireless signal, the state of the feed circuit of the second antenna module can be adjusted to make the feed circuit of the second antenna module open, thereby avoiding a situation in which the transceiving performance of the first antenna module is degraded due to coupling formed between the second antenna module and the first antenna module, and improving the transceiving performance of the first antenna module.

In other embodiments, when the first antenna module and the second antenna module both transmit and receive the wireless signal, the state of the feed circuit of the first antenna module and the state of the feed circuit of the second antenna module can be adjusted to make a transceiving frequency of the second antenna module much larger or much smaller than a transceiving frequency of the first antenna module. In this way, a situation in which the transceiving performance is degraded due to the coupling between the second antenna module and the first antenna module formed when the first middle frame and the second middle frame is closed can be avoided, and the transceiving performance of the first antenna module and the second antenna module can be improved. For example, when the first antenna module transmits and receives a wireless signal of a first frequency, the impedance matching of the feed circuit of the second antenna module can be adjusted, so that the second antenna module transmits and receives a wireless signal of a second frequency which is much smaller than the first frequency. The first frequency can be 2.4 GHz, and the second frequency can be 500 MHz.

Figure 2:
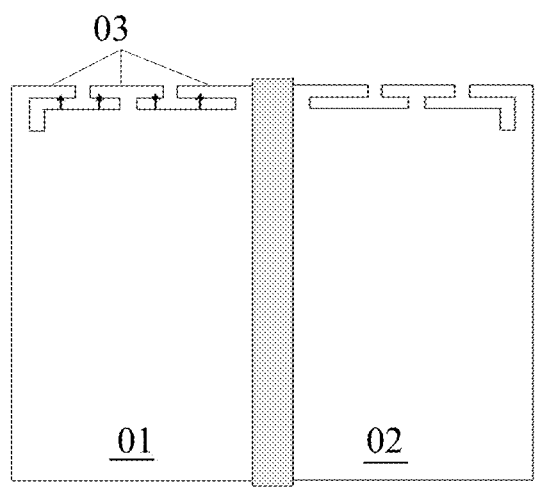
FIG. 2 is a schematic diagram of a terminal device in some other embodiments.

As shown in FIG. 2, in an implementation of a mobile phone with a foldable form, an antenna module 03 is arranged on the primary side 01, and no antenna module is arranged on the secondary side 02, and only a groove is formed on the secondary side 02 symmetrically to reduce an impact of the coupling when the mobile phone is closed.

Various embodiments of the present disclosure provide a structure where the first middle frame and the second middle frame can be unfolded or closed through the rotary shaft. The first antenna module is located on the first middle frame, the second antenna module is located on the second middle frame, and the first antenna module and the second antenna module are connected to the corresponding feed circuits, respectively. In this way, on the one hand, the first antenna module and the second antenna module can communicate independently when the first middle frame and the second middle frame are unfolded through the rotary shaft; and when the first middle frame and the second middle frame are closed through the rotary shaft, the mutual interference between the transmitting and receiving the wireless signal by the first antenna module and the transmitting and receiving the wireless signal by the second antenna module can be reduced by adjusting respective independent feed circuits of the first antenna module and the second antenna module, thereby improving the transceiving performance of the first antenna module and the second antenna module. On the other hand, in the embodiments of the present disclosure, antenna modules for transmitting and receiving the wireless signal are provided on both middle frames of the terminal device with the foldable form, instead of only arranging the antenna module for transmitting and receiving the wireless signal on one middle frame. In this way, an available frequency band for the terminal device can be extended, space waste caused by only one middle frame with the antenna module can be reduced, and space utilization of the terminal device can be improved.

Figure 3:
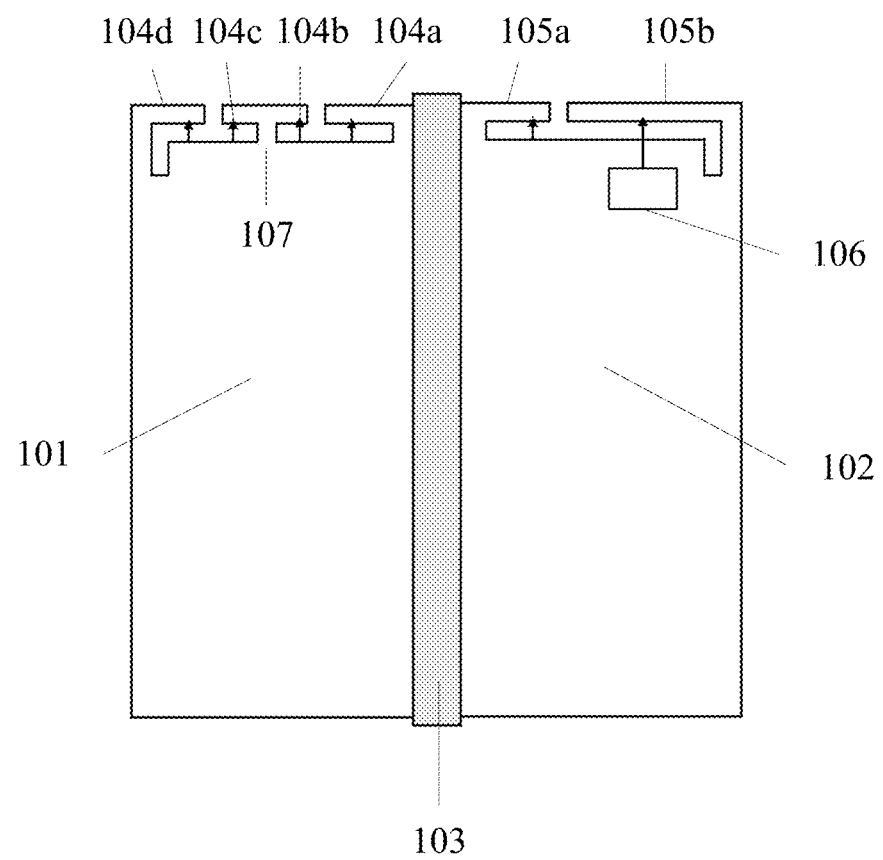
FIG. 3 is a second schematic diagram showing a terminal device according to some embodiments.
Figure 4:
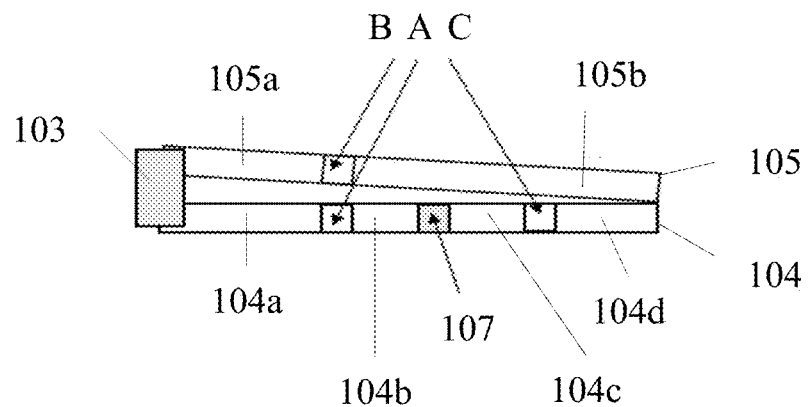
FIG. 4 is a third schematic diagram showing a terminal device according to some embodiments.

In some embodiments, as shown in FIGS. 3 and 4, the first antenna module 104 includes: a first radiator 104a and a second radiator 104b, and a first slit (or broken seam, or breaking joint) A is provided between the first radiator 104a and the second radiator 104b.

The second antenna module 105 includes: a third radiator 105a and a fourth radiator 105b, and a second slit B is provided between the third radiator 105a and the fourth radiator 105b.

When the first middle frame 101 and the second middle frame 102 are closed, the first radiator 104a and the third radiator 105a overlap with each other, and the first slit A and the second slit B overlap with each other.

The feed circuit 106 of the second antenna module is connected to the fourth radiator 105b.

In the embodiments of the present disclosure, a radiation length of the first radiator is equal to a radiation length of the second radiator. A width of the first slit is equal to a width of the second slit.

The above arrangement of the first slit may increase isolation between the first radiator and the second radiator, thereby reducing the mutual influence between the first radiator and the second radiator, and improving the transceiving performance of different radiators on the first middle frame. Similarly, the above arrangement of the second slit may increase the isolation between the third radiator and the fourth radiator, thereby reducing the mutual influence between the third radiator and the fourth radiator, and improving the transceiving performance of different radiators on the second middle frame.

It should be noted that the width of the first slit and the width of the second slit are positively correlated with the isolation, respectively. The larger the width of the first slit and the width of the second slit, the better the isolation effect between different radiators.

The first antenna module includes the first radiator and the second radiator; and the second antenna module includes the third radiator and the fourth radiator. The first radiator, the second radiator, the third radiator and the fourth radiator can be connected to different feed terminals, respectively, to transmit and receive the wireless signals in different frequency bands.

In some embodiments, the first radiator can be a radiator of a blue tooth (BT) antenna; the second radiator can be a radiator of a wireless fidelity (Wi-Fi) antenna, and the third radiator can be a radiator of a universal mobile telecommunications system (UMTS) antenna, and the fourth radiator can be a radiator of a ZigBee protocol-based communication antenna.

In the embodiments of the present disclosure, the feed circuit of the second antenna module is connected to the fourth radiator. In this way, on the one hand, a transceiving frequency band of the fourth radiator can be adjusted by adjusting the feed circuit of the second antenna module, so that the transceiving frequency band of the fourth radiator can be much larger than that of the second radiator, and a situation where the transceiving performance is degraded due to the coupling between the fourth radiator and the second radiator formed when the first middle frame and the second middle frame are closed is avoided, and the transceiving performance of the fourth radiator and the second radiator is improved; on the other hand, a state of a feed position of the fourth radiator can be adjusted by adjusting the feed circuit of the second antenna module, so that the feed circuit of the fourth radiator is open-circuited when the second radiator transmits and receives the wireless signal, thereby avoiding a situation where the transceiving performance of the second radiator is degraded due to the coupling formed between the fourth radiator and the second radiator, and improving the transceiving performance of the second radiator.

In some embodiments, as shown in FIGS. 3 and 4, the first antenna module further includes: a fifth radiator 104c and a sixth radiator 104d, and a rib 107 is provided between the second radiator 104b and the fifth radiator 104c, a third slit C is provided between the sixth radiator 104d and the fifth radiator 104c.

In the embodiments of the present disclosure, the fifth radiator and the sixth radiator can be different types of radiators, and are connected to different feed terminals, respectively, to transmit and receive the wireless signals of different frequency bands.

In some embodiments, the fifth radiator can be a radiator of a long-term evolution (LTE) antenna, and the sixth radiator is a radiator of the universal mobile telecommunications system (UMTS) antenna, which is not limited by the embodiments of the present disclosure.

The rib can be connected to a ground point of the terminal device, so that a return current towards ground of the second radiator and the fifth radiator may reflow to the ground through the rib.

It should be noted that the rib can separate a block radiator into the second radiator and the fifth radiator. A shape of the block radiator can be set to a T shape; a radiation length of the second radiator and a radiation length of the fifth radiator can be same or different, which is not limited by the embodiments of the present disclosure.

In the embodiments of the present disclosure, when the radiation length of the second radiator is different from the radiation length of the fifth radiator, the terminal device may transmit and receive the wireless signals in more frequency bands; when the radiation length of the second radiator is the same as the radiation length of the fifth radiator, a strength of the transceived wireless signal can be improved.

A width of the third slit can be the same as or different from the width of the first slit, which is not limited by the embodiments of the present disclosure. The width of the third slit can be the same as or different from the width of the second slit, which is not limited by the embodiments of the present disclosure.

The above arrangement of the third slit may increase the isolation between the fifth radiator and the sixth radiator, thereby reducing the mutual influence between the fifth radiator and the sixth radiator, and improving the transceiving performance of different radiators on the second middle frame.

It should be noted that the width of the third slit is positively correlated with the isolation. The larger the width of the third slit, the better the isolation effect between the fifth radiator and the sixth radiator.

In some embodiments, the feed circuit of the second antenna module includes a switch module, which is used for switching a feed position of the second antenna module to be open-circuited or short-circuited when frequency bands for transmitting and receiving wireless signals by the terminal device are different.

In the embodiments of the present disclosure, the second antenna module includes: the third radiator and the fourth radiator. When the feed circuit of the second antenna module is connected to the fourth radiator, and correspondingly, the switch module is used for switching the feed position of the fourth radiator to be open-circuited or short-circuited; and when the feed circuit of the second antenna module is connected to the third radiator, and correspondingly, the switch module is used for switching the feed position of the third radiator to be open-circuited or short-circuited.

A switching state of the switch module includes a connected state and a disconnected state. When the switch module is in the connected state, and the feed circuit of the second antenna module is connected to the fourth radiator, the feed circuit of the fourth radiator is directly grounded, and then the feed position of the fourth radiator can be switched to be short-circuited; and when the switch module is in the disconnected state and the feed circuit of the second antenna module is connected to the fourth radiator, the feed circuit of the fourth radiator is disconnected, and then the feed position of the fourth radiator can be switched to be open-circuited.

In the embodiments of the present disclosure, the switch module may include a component composed of a MOS transistor or a triode. The switch module includes a control terminal and two connection terminals. The control terminal is used for receiving a control signal and controlling the switching state of the switch module based on the control signal. The control signal can be sent by a radio frequency chip or a controller to the control terminal. The control signal includes, but is not limited to, an output level to the control terminal. When a level of the control terminal is low, the control switch module is controlled to be in the connected state. When the level of the control terminal is high, the control switch module is controlled to be in the disconnected state.

The switch module may also include a single-pole double-throw switch or a single-pole four-throw switch, which is not limited by the embodiments of the present disclosure.

In some embodiments, as shown in FIG. 3, the first antenna module includes: the first radiator and the sixth radiator; the second antenna module includes: the fourth radiator; and the feed circuit of the second antenna module is connected to the four radiator; the switch module can be used for switching the feed position of the fourth radiator to be short-circuited when a double frequency of the fourth radiator falls within an operating frequency band range of the sixth radiator. In this way, it is possible to avoid a situation where the transceiving performance of the sixth radiator is degraded due to a low-efficiency current mode of the fourth radiator and improve the transceiving performance of the sixth radiator.

The switch module may also be used for switching the feed position of the fourth radiator to be the open-circuited when the first radiator transmits and receives the wireless signal and the feed position of the fourth radiator is short-circuited. In this way, it is possible to avoid a situation where the performance of the first radiator is degraded due to an operating frequency of the third radiator excited by the fourth radiator falling within an operating frequency band of the first radiator, and improve the transceiving performance of the first radiator.

Figure 5:
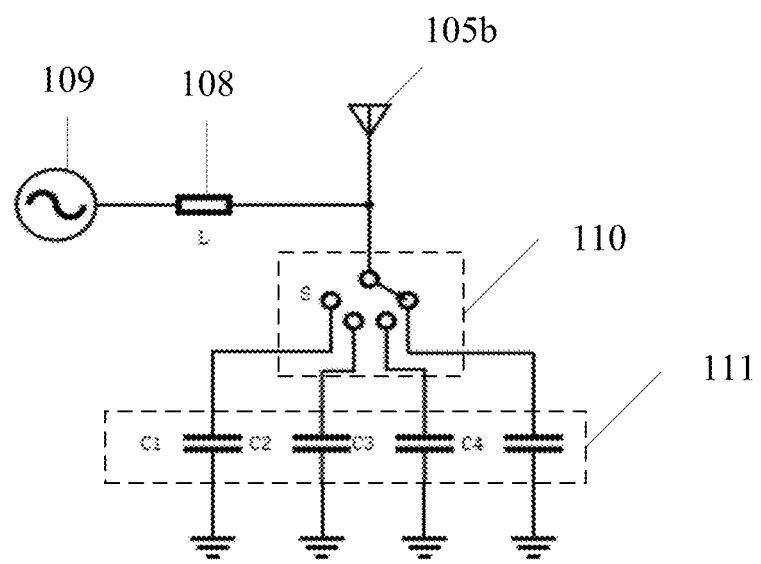
FIG. 5 is a fourth schematic diagram showing a terminal device according to some embodiments.

In some embodiments, as shown in FIG. 5, the feed circuit of the second antenna module includes:

an inductor 108, wherein one end of the inductor 108 is connected to a feed source 109, and the other end of the inductor 108 is connected to the switch module 110; and at least two capacitors 111 arranged in parallel, wherein one end of each capacitor 110 is grounded, and the other end is connected to the switch module 110.

When the state of the switch module 110 is in connection with a capacitor, the feed position of the second antenna module is short-circuited.

When the state of the switch module 110 is in disconnection with the capacitors, the feed position of the second antenna module is open-circuited.

There can be multiple inductors, and the multiple inductors can be connected in series. In the embodiments of the present disclosure, an inductance value can be set in a range of 30 nH to 60 nH, which is not limited by the embodiments of the present disclosure.

Capacitance values corresponding to different capacitors among the at least two capacitors arranged in parallel can be same or different, which is not limited by the embodiments of the present disclosure.

In the embodiments of the present disclosure, the number of capacitors can be set according to actual needs. For example, the feed circuit has four capacitors arranged in parallel, or the feed circuit has two capacitors arranged in parallel, which is not limited by the embodiments of the present disclosure.

The switch module includes a first contact terminal and a second contact terminal. The first contact terminal is connected to the inductor, and the second contact terminal is connected to the at least two capacitors arranged in parallel. The second contact terminal includes a plurality of contact points, and one contact point is connected to one capacitor. In the embodiments of the present disclosure, the number of contact points can be set the same as the number of capacitors, so that the switch module may better establish electrical connections with the capacitors.

In the embodiments of the present disclosure, the switching states of the switch module are different. The first contact terminal may establish connections with the multiple contact points of the second contact terminal at the same time, and it may also establish no connections with the multiple contact points of the second contact terminal at the same time, and it may also establish connections with a part of the contact points in the second contact terminal, which is not limited by the embodiment of the present disclosure.

It should be noted that a connection state between the capacitor and the inductor can be changed through the different switching states of the switch module. For example, when the switching state of the switch module is that the first contact terminal establishes the connections with the multiple contact points of the second contact terminal at the same time, the feed source can be connected to the ground through the capacitor, and the second antenna module can be connected to the ground through the feed source based on a principle of the capacitor that it blocks a direct current but passes an alternating current, so that the feed position of the second antenna module can be switched to be short-circuited.

When the switching state of the switch module is that the first contact terminal establishes no connections with the multiple contact points of the second contact terminal at the same time, the open circuit is formed between the capacitor and the inductor, that is, the feed position of the second antenna module is switched to be open-circuited.

When the switching state of the switch module is that the first contact terminal establishes connections with a part of the contact points in the second contact terminal, different impedances can be formed by the capacitor and the inductor. For example, when the switching state of the switch module is that the first contact terminal establishes the connection with one contact point in the second contact terminal, a first inductance can be formed by the capacitor and the inductor; when the switching state of the switch module is that the first contact terminal establishes the connections with two contact points in the second contact terminal, a second inductance different from the first inductance can be formed by the capacitor and the inductor; based on the first impedance and the second impedance, it is achieved that the second antenna module is capable of transmitting and receiving the wireless signals in different frequency bands.

In some embodiments, as shown in FIG. 3, when the first middle frame and the second middle frame are closed, the feed circuit of the second antenna module is connected to the fourth radiator. In the embodiments of the present disclosure, a current mode of the fourth radiator may cause degradation of the transceiving performance of the sixth radiator. The current mode of the fourth radiator may be broken by switching the feed position of the fourth radiator to be short-circuited, thereby reducing the influence of the fourth radiator on the sixth radiator and improving the transceiving performance of the sixth radiator.

When the feed position of the fourth radiator is switched to be short-circuited, the fourth radiator may affect the transceiving performance of the first radiator through the third radiator. In the embodiments of the present disclosure, the feed position of the fourth radiator is switched to be open-circuited, which can reduce the influence of the fourth radiator on the first radiator and improve the transceiving performance of the first radiator.

In some embodiments, as shown in FIG. 5, the at least two capacitors arranged in parallel include: a first capacitor and a second capacitor arranged in parallel with the first capacitor, and a first capacitance value of the first capacitor is greater than a second capacitance value of the second capacitor.

When the first middle frame and the second middle frame are unfolded, the state of the switch module is in connection with the first capacitor and in disconnection with the second capacitor.

When the first middle frame and the second middle frame are closed, the state of the switch module is in connection with the second capacitor and in disconnection with the first capacitor.

In the embodiments of the present disclosure, when the first middle frame and the second middle frame are unfolded or closed through the rotary shaft, a capacitive load can be formed between the first middle frame and the second middle frame, which causes frequency deviation of the antenna. Based on this, in the embodiments of the present disclosure, when the first middle frame and the second middle frame are unfolded through the rotary shaft, the frequency deviation caused by the unfolding of the terminal device can be offset by connecting the first capacitor and disconnecting from the second capacitor; when the first middle frame and the second middle frame are closed through the rotary shaft, the frequency deviation caused by the closing of the terminal device can be offset by connecting the second capacitor and disconnecting from the first capacitor.

In this way, the influence of the closing or unfolding of the terminal device on the transmitting and receiving the wireless signal by the second antenna module can be reduced through the different switching states of the switch module, thereby improving the transceiving performance of the second antenna module.

In some embodiments, as shown in FIG. 3, the feed circuit 106 of the second antenna module is connected to the fourth radiator 105b. In the embodiments of the present disclosure, the influence of closing or unfolding of the terminal device on the transmitting and receiving the wireless signal by the fourth radiator can be reduced by connecting different capacitors in the different switching states of the switch module, thereby improving the transceiving performance of the fourth radiator.

In some embodiments, a radiation length of the fourth radiator is greater than a radiation length of the third radiator.

In the embodiments of the present disclosure, the radiation length of the radiator is negatively correlated with a radiation frequency, and the radiation frequency of the fourth radiator is smaller than the radiation frequency of the third radiator.

In some embodiments, the fourth radiator can be used for transmitting and receiving communication frequency bands corresponding to 2G and 3G; the third radiator can be used for transmitting and receiving frequency bands corresponding to N78 and N79 in a 5G frequency band, which is not limited by the embodiments of the present disclosure.

In some embodiments, as shown in FIG. 4, both the third radiator and the fourth radiator are in an inverted L shape.

In some embodiments, a sum of the radiation length of the second radiator, the radiation length of the fifth radiator, the radiation length of the sixth radiator, the width of the rib and the width of the third slit is equal to the radiation length of the fourth radiator.

In the embodiments of the present disclosure, when the first middle frame and the second middle frame of the terminal device are closed through the rotary shaft, a projection of the fourth radiator on the first middle frame overlaps with the second radiator, the fifth radiator and the sixth radiator, that is, when the first middle frame and the second middle frame of the terminal device are closed through the rotary shaft, the second radiator, the fifth radiator and the sixth radiator exactly face the fourth radiator.

The radiation length of the fourth radiator is greater than the radiation length of the sixth radiator. When the double frequency of the fourth radiator falls within the operating frequency band range of the sixth radiator, the low-efficiency current mode of the double frequency of the fourth radiator may cause the degradation of the transceiving performance of the sixth radiator. Based on this, in the embodiments of the present disclosure, the feed position of the fourth radiator is switched to be short-circuited through the switching state of the switch module, thereby breaking the current mode of the fourth radiator and avoiding a situation where the performance degrades due to the coupling between the fourth radiator and the sixth radiator.

The radiation length of the first radiator is same as the radiation length of the third radiator, and correspondingly, the current mode of the first radiator is same as the current mode of the third radiator. When the feed position of the fourth radiator is switched to be short-circuited, the third radiator may couple with a part close to the fourth radiator, forming the low-efficiency current mode. Since the operating frequency of the current mode formed based on the coupling may fall within the operating frequency band range of the first radiator, leading to the degradation of the performance of the first radiator. Therefore, the present disclosure enables the feed position of the fourth radiator to be switched to be open-circuited through the switching state of the switch module, which may avoid a situation where the third radiator couples with the part close to the fourth radiator, thereby reducing the influence on the transceiving performance of the first radiator.

In some embodiments, as shown in FIG. 4, both the first radiator and the sixth radiator are in an inverted L shape.

It should be noted that the "first", "second", "third", "fourth", "fifth" and "sixth" in the embodiments of the present disclosure are only for convenience of expression and distinction without any special meaning.

Figure 6:
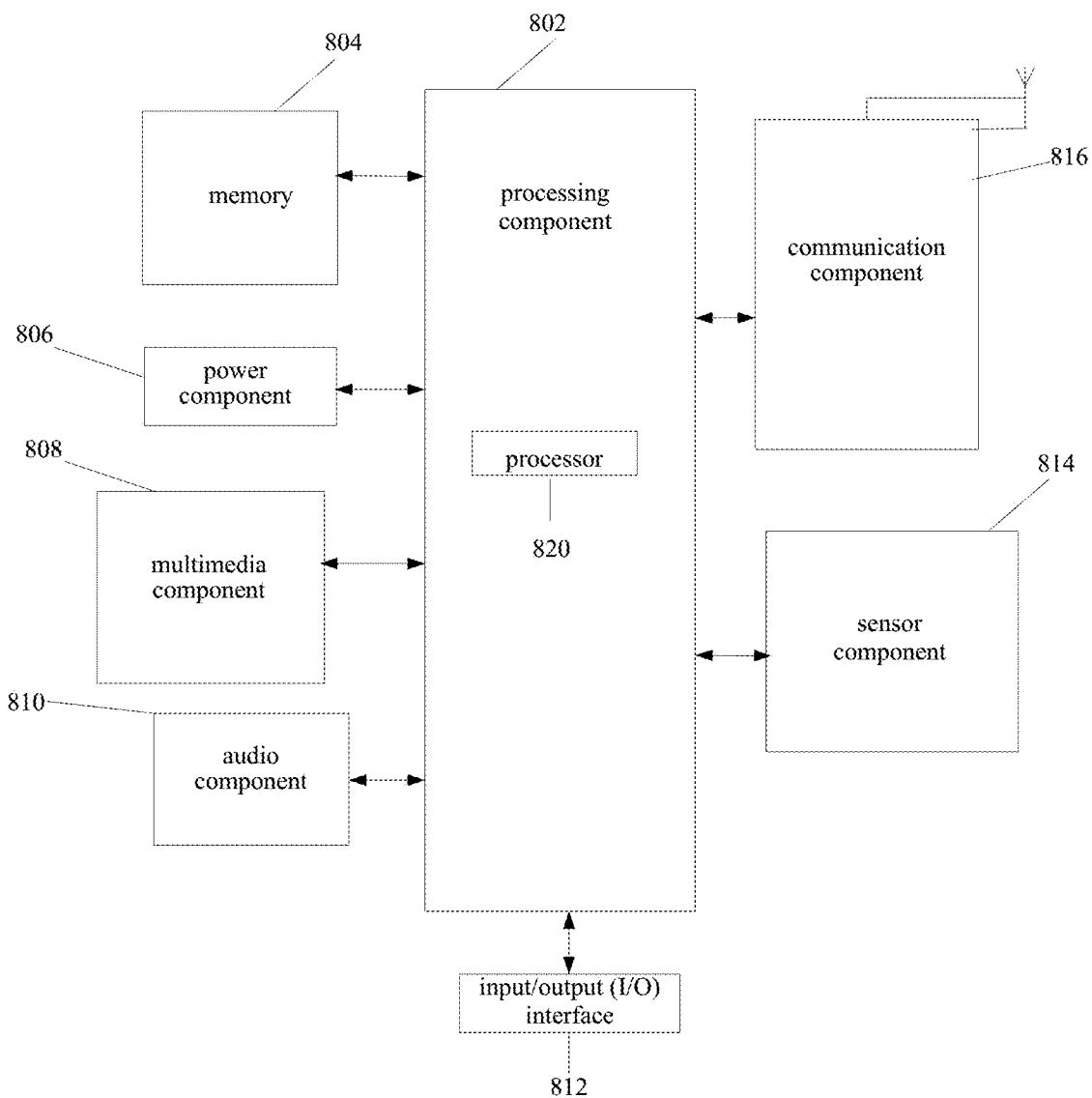
FIG. 6 is a block diagram showing a terminal device according to some embodiments.

FIG. 6 is a block diagram showing a terminal device according to some embodiments. For example, the terminal device can be a mobile phone, a computer, a digital broadcasting terminal, a messaging device, a game console, a tablet device, a medical device, a fitness device, a personal digital assistant, etc.

Referring to FIG. 6, the terminal device may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operations of the terminal device, such as the operations associated with display, telephone calls, data communications, camera operations, and recording operations. The processing component 802 can include one or more processors 820 to execute instructions to perform all or part of the steps in the above described methods. Moreover, the processing component 802 can include one or more modules to facilitate the interaction between the processing component 802 and other components. For example, the processing component 802 can include a multimedia module to facilitate the interaction between the multimedia component 808 and the processing component 802.

The memory 804 is configured to store various types of data to support the operation of the terminal device. Examples of such data include instructions for any application or method operated on device 800, such as the contact data, the phone book data, messages, pictures, videos, and the like. The memory 804 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device. The power component 806 can include a power management system, one or more power sources, and other components associated with the generation, management, and distribution of power in the terminal device.

The multimedia component 808 includes a screen providing an output interface between the terminal device and the user. In some embodiments, the screen can include a liquid crystal display (LCD) and a touch panel (TP). In some implementations, an organic light-emitting diode (OLED) can be employed.

If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. When the terminal device is in an operation mode, such as a photographing mode or a video mode, the front camera and/or the rear camera can receive external multimedia datum. Each of the front camera and the rear camera can be a fixed optical lens system or have focus and optical zoom capability.

The audio component 810 is configured to output and/or input an audio signal. For example, the audio component 810 includes a microphone (MIC) configured to receive an external audio signal when the terminal device is in an operation mode, such as a call mode, a recording mode, and a voice recognition mode. The received audio signal can be further stored in the memory 804 or sent via the communication component 816. In some embodiments, the audio component 810 also includes a speaker for outputting the audio signal.

The I/O interface 812 provides an interface between the processing component 802 and peripheral interface modules, such as a keyboard, a click wheel, buttons, and the like. These buttons may include, but are not limited to, a home button, a volume button, a starting button, and a locking button.

The sensor component 814 includes one or more sensors for providing status assessments of various aspects of the terminal device. For example, the sensor component 814 can detect an open/closed status of the terminal device, relative positioning of components, such as the display and the keypad of the terminal device. The sensor component 814 can also detect a change in position of one component of the terminal device or the terminal device, the presence or absence of user contact with the terminal device, an orientation, or an acceleration/deceleration of the terminal device, and a change in temperature of the terminal device. The sensor component 814 can include a proximity sensor configured to detect the presence of nearby objects without any physical contact. The sensor component 814 can also include a light sensor, such as a CMOS or CCD image sensor, configured to use in imaging applications. In some embodiments, the sensor component 814 can also include an accelerometer sensor, a gyroscope sensor, a magnetic sensor, a pressure sensor, or a temperature sensor.

The communication component 816 is configured to facilitate wired or wireless communication between the terminal device and other devices. The terminal device can access a wireless network based on a communication standard, such as W-iFi, 2G, 3G, 4G, 5G, or 6G, or a combination thereof. In some embodiments, the communication component 816 receives broadcast signals or broadcast associated information from an external broadcast management system via a broadcast channel. In some embodiments, the communication component 816 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the terminal device can be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, and can be configured to perform the above described method.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms, and these phrases can be interchangeably used.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in some embodiments of the present disclosure can be understood by those of ordinary skill in the art on a case-by-case basis.

In the description of present disclosure, it is to be understood that the terms "lower," "upper," "center," "longitudinal," "transverse," "length," "width," "thickness," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "at," "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A terminal device, comprising:
   a first middle frame;
   a second middle frame connected to the first middle frame, wherein the first middle frame and the second middle frame are configured to fold or unfold via a rotary shaft;
   a first antenna module, disposed at the first middle frame;
   a second antenna module, disposed at the second middle frame, wherein when the first middle frame and the second middle frame are closed, a projection of the second antenna module to the first antenna module at least partially overlaps with the first antenna module; and
   wherein the first antenna module and the second antenna module are respectively connected to corresponding feed circuits;
   wherein the first antenna module comprises: a first radiator, a second radiator, a fifth radiator and a sixth radiator, and a rib is provided between the second radiator and the fifth radiator, a third slit is provided between the sixth radiator and the fifth radiator;
   wherein the second antenna module comprises: a third radiator and a fourth radiator; and
   wherein a sum of a radiation length of the second radiator, a radiation length of the fifth radiator, a radiation length of the sixth radiator, a width of the rib and a width of the third slit is equal to a radiation length of the fourth radiator.

2. The terminal device according to claim 1, wherein a first slit is provided between the first radiator and the second radiator;
   a second slit is provided between the third radiator and the fourth radiator;
   when the first middle frame and the second middle frame are closed, the first radiator and the third radiator overlap with each other, and the first slit and the second slit overlap with each other; and
   the feed circuit of the second antenna module is connected to the fourth radiator.

3. The terminal device according to claim 2, wherein a radiation length of the fourth radiator is greater than a radiation length of the third radiator.

4. The terminal device according to claim 2, wherein the third radiator and the fourth radiator are both in an inverted L shape.

5. The terminal device according to claim 2, wherein the first radiator and the sixth radiator are both in an inverted L shape.

6. The terminal device according to claim 1, wherein the feed circuit of the second antenna module comprises a switch module, configured to switch a feed position of the second antenna module to be open-circuited or short-circuited when frequency bands for transmitting and receiving a wireless signal by the terminal device are different.

7. The terminal device according to claim 6, wherein the feed circuit of the second antenna module further comprises:
- an inductor, wherein one end of the inductor is connected to a feed source, and the other end of the inductor is connected to the switch module; and
- at least two capacitors arranged in parallel, wherein one end of each capacitor is grounded, and the other end is connected to the switch module;
- when a state of the switch module is in connection with a capacitor, the feed position of the second antenna module is short-circuited; and
- when the state of the switch module is in disconnection with the capacitors, the feed position of the second antenna module is open-circuited.

8. A terminal device, comprising:
- a first middle frame;
- a second middle frame connected to the first middle frame, wherein the first middle frame and the second middle frame are configured to fold or unfold via a rotary shaft;
- a first antenna module, disposed at the first middle frame;
- a second antenna module, disposed at the second middle frame, wherein when the first middle frame and the second middle frame are closed, a projection of the second antenna module to the first antenna module at least partially overlaps with the first antenna module; and
- wherein the first antenna module and the second antenna module are respectively connected to corresponding feed circuits;
- wherein the feed circuit of the second antenna module comprises a switch module, configured to switch a feed position of the second antenna module to be open-circuited or short-circuited when frequency bands for transmitting and receiving a wireless signal by the terminal device are different;
- wherein the feed circuit of the second antenna module further comprises:
- an inductor, wherein one end of the inductor is connected to a feed source, and the other end of the inductor is connected to the switch module; and
- at least two capacitors arranged in parallel, wherein one end of each capacitor is grounded, and the other end is connected to the switch module;
- when a state of the switch module is in connection with a capacitor, the feed position of the second antenna module is short-circuited; and
- when the state of the switch module is in disconnection with the capacitors, the feed position of the second antenna module is open-circuited;
- wherein the at least two capacitors arranged in parallel comprise:
- a first capacitor and a second capacitor arranged in parallel with the first capacitor, and a first capacitance value of the first capacitor is greater than a second capacitance value of the second capacitor;
- when the first middle frame and the second middle frame are unfolded, the state of the switch module is in connection with the first capacitor and in disconnection with the second capacitor; and
- when the first middle frame and the second middle frame are closed, the state of the switch module is in connection with the second capacitor and in disconnection with the first capacitor.

9. A mobile phone, comprising:
- a first middle frame;
- a second middle frame connected to the first middle frame, wherein the first middle frame and the second middle frame are configured to fold or unfold via a rotary shaft;
- a first antenna module disposed at the first middle frame;
- a second antenna module disposed at the second middle frame, wherein when the first middle frame and the second middle frame are folded, a projection of the second antenna module to the first antenna module at least partially overlaps with the first antenna module; and
- a display screen;
- wherein the first antenna module and the second antenna module are respectively connected to corresponding feed circuits;
- wherein the first antenna module and the second antenna module are configured to communicate independently when the first middle frame and the second middle frame are unfolded through the rotary shaft; and when the first middle frame and the second middle frame are folded through the rotary shaft, mutual interference between transmitting and receiving the wireless signals by the first antenna module and the transmitting and receiving the wireless signals by the second antenna module are reduced by adjusting the respective independent feed circuits of the first antenna module and the second antenna module, thereby improving transceiving performance of the first antenna module and the second antenna module.

10. The mobile phone according to claim 9, wherein the first antenna module comprises: a first radiator and a second radiator, and a first slit is provided between the first radiator and the second radiator;
- the second antenna module comprises: a third radiator and a fourth radiator, and a second slit is provided between the third radiator and the fourth radiator;
- when the first middle frame and the second middle frame are closed, the first radiator and the third radiator overlap with each other, and the first slit and the second slit overlap with each other; and
- the feed circuit of the second antenna module is connected to the fourth radiator.

11. The mobile phone according to claim 10, wherein the first antenna module further comprises a fifth radiator and a sixth radiator, and a rib is provided between the second radiator and the fifth radiator, a third slit is provided between the sixth radiator and the fifth radiator.

12. The mobile phone according to claim 11, wherein a sum of a radiation length of the second radiator, a radiation length of the fifth radiator, a radiation length of the sixth radiator, a width of the rib and a width of the third slit is equal to a radiation length of the fourth radiator.

13. The mobile phone according to claim 11, wherein
the first radiator and the sixth radiator are both in an inverted L shape; and
the first antenna module and the second antenna module are disposed on the first middle frame and the second middle frame, respectively, in a foldable configuration, to thereby extend available frequency bands for the mobile phone, and improve space utilization of the mobile phone.

14. The mobile phone according to claim 10, wherein a radiation length of the fourth radiator is greater than a radiation length of the third radiator.

15. The mobile phone according to claim 10, wherein the third radiator and the fourth radiator are both in an inverted L shape.

16. The mobile phone according to claim 9, wherein the feed circuit of the second antenna module comprises a switch module, configured to switch a feed position of the second antenna module to be open-circuited or short-circuited when frequency bands for transmitting and receiving a wireless signal by the mobile phone are different.

17. The mobile phone according to claim 16, wherein the feed circuit of the second antenna module further comprises:
an inductor, wherein one end of the inductor is connected to a feed source, and the other end of the inductor is connected to the switch module; and
at least two capacitors arranged in parallel, wherein one end of each capacitor is grounded, and the other end is connected to the switch module;
when a state of the switch module is in connection with a capacitor, the feed position of the second antenna module is short-circuited; and
when the state of the switch module is in disconnection with the capacitors, the feed position of the second antenna module is open-circuited.

18. The mobile phone according to claim 17, wherein the at least two capacitors arranged in parallel comprise:
a first capacitor and a second capacitor arranged in parallel with the first capacitor, and a first capacitance value of the first capacitor is greater than a second capacitance value of the second capacitor;
when the first middle frame and the second middle frame are unfolded, the state of the switch module is in connection with the first capacitor and in disconnection with the second capacitor; and
when the first middle frame and the second middle frame are closed, the state of the switch module is in connection with the second capacitor and in disconnection with the first capacitor.

\* \* \* \* \*